US007304976B2

(12) United States Patent
Mao et al.

(10) Patent No.: US 7,304,976 B2
(45) Date of Patent: Dec. 4, 2007

(54) METHOD AND APPARATUS FOR CONTROL AND ROUTING OF WIRELESS SENSOR NETWORKS

(75) Inventors: Shiwen Mao, Blacksburg, VA (US); Yiwei T. Hou, Blacksburg, VA (US)

(73) Assignee: Virginia Tech Intellectual Properties, Inc., Blacksburg, VA (US)

( * ) Notice: Subject to any disclaimer, the term of this patent is extended or adjusted under 35 U.S.C. 154(b) by 511 days.

(21) Appl. No.: 11/045,287

(22) Filed: Jan. 31, 2005

(65) Prior Publication Data

US 2006/0077918 A1    Apr. 13, 2006

Related U.S. Application Data

(60) Provisional application No. 60/617,661, filed on Oct. 13, 2004.

(51) Int. Cl.
*H04Q 7/24* (2006.01)
(52) U.S. Cl. ............... 370/338; 370/352; 370/315; 455/562.1; 455/445; 340/870.11
(58) Field of Classification Search ........... 370/338, 370/352, 315; 340/870.11; 455/562.1, 445
See application file for complete search history.

(56) References Cited

U.S. PATENT DOCUMENTS 6,671,525 B2 * 12/2003 Allen et al. .............. 455/574

| | | | |
|---|---|---|---|
| 2003/0012168 A1 * | 1/2003 | Elson et al. ............... | 370/338 |
| 2003/0202479 A1 * | 10/2003 | Huang et al. ............. | 370/252 |
| 2004/0190476 A1 * | 9/2004 | Bansal et al. ............. | 370/338 |
| 2005/0064871 A1 * | 3/2005 | Kawasaki et al. ......... | 455/450 |
| 2005/0122233 A1 * | 6/2005 | Isoyama et al. ....... | 340/870.11 |
| 2006/0046664 A1 * | 3/2006 | Paradiso et al. ............ | 455/96 |
| 2006/0062154 A1 * | 3/2006 | Choy et al. ............... | 370/242 |
| 2006/0087992 A1 * | 4/2006 | Ganesh ..................... | 370/310 |

* cited by examiner

*Primary Examiner*—Danh Le
(74) *Attorney, Agent, or Firm*—Whitham Curtis Christofferson & Cook, PC (57) ABSTRACT

A scalable, minimum node complexity, energy efficient, and error-resilient routing method for wireless sensor networks is described. The network is partitioned into regions by power controlled base station scans using a directional antenna. Routing is performed using only local location information and instructions received from the base station at each sensor node with minimum processing and control overhead, thus allowing simple, low-cost sensor designs. Sensors in the network provide to a base station reports of the condition of the sensors themselves, and these reports are analyzed by the base station to determine improved routing instructions, which are then provided to the sensor nodes in control messages. Each data packet is relayed in an interleaved, loop-free mesh of sectors toward the base station, making data delivery robust to sensor failures and transmission errors. The disclosure also contains descriptions for simple edge-based tasking, query, code distribution, and network programming for sensor nodes. The method is suitable for large-scale, dense sensor networks for detection, alarming, and monitoring applications.

23 Claims, 9 Drawing Sheets

METHOD AND APPARATUS FOR CONTROL AND ROUTING OF WIRELESS SENSOR NETWORKS

This application claims the benefit of Provisional Application No. 60/617,661 entitled A Directional Antenna-Enabled Routing Table-Free Data Forwarding Scheme for Wireless Sensor Networks filed on Oct. 13, 2004. The invention was made under partial support of grant number ANI-0312655 from the National Science Foundation.

BACKGROUND OF THE INVENTION

1. Field of the Invention

The present invention generally relates to wireless sensor networks, and more particularly to control and routing schemes for such networks.

2. Background Description

In recent years, as the cost of mass produced semiconductor devices has declined, it has become feasible to deploy networks of small devices for sensing fields in the physical world and transmitting sensed data for analysis. These devices can be deployed to provide dense monitoring close to physical phenomena of interest. For example, such sensors can be used to monitor environmental parameters (such as humidity and temperature) or some special events (such as the motion of a target object) in a sensed field. Generally, sensors perform two types of operations: sensing and communicating observed phenomena home. Networked sensors are widely used in various situations, such as monitoring seismic structure response, marine microorganisms, contaminant transport, ecosystems, and battlefields.

Wireless sensor networks, in which each sensor is equipped with a wireless transceiver, are especially useful when infrastructure is unavailable. The recent advances in light-weight operating systems, VLSI technologies, and wireless communications have greatly reduced the size and cost of wireless sensor devices. Therefore, it is possible to deploy large-scale, dense wireless sensor networks to provide environmental monitoring that is suitably dense with respect to both the spatial location and the time of interest.

A wireless sensor network is expected to accomplish sensing, processing, and multi-hop wireless communications. However, the stringent physical constraints involved in designing sensor nodes (i.e., size, cost, and energy) have imposed a severely limited design space on hardware and software complexity, making practical implementation a challenging task. Specifically, for a future sensor node packaged on a cubic-millimeter scale or even smaller, the storage, processing, and communication capabilities on the node will be extremely limited.

The concerns of the prior art argue in favor of doing as much processing and communication as possible at the nodes, on the supposition that each sensor node is capable of executing sophisticated algorithms and protocols. But in reality, when the size of a sensor node goes down to a cubic-millimeter scale, the processing, communication, storage and battery at a sensor node are extremely limited.

Many prior art protocols exploit location information to simplify routing operations. Although these protocols have less computational complexity in routing, they have extra hardware requirements and control overhead on acquiring and distributing location information (e.g., using GPS devices or querying a location database). What is needed is a protocol where location discovery is performed without GPS devices, and without spending energy distributing location information around the network via the sensors, thus allowing simple and low-cost sensor design.

Several sensor routing protocols, such as Low-Energy Adaptive Clustering Hierarchy (LEACH) and GRAdient Broadcast, are designed for large-scale sensor networks. LEACH provides a distributed cluster formation technique, in which sensors elect and rotate cluster heads and form clusters without the involvement of base stations. Therefore, a considerable amount of energy may be spent on maintaining the clusters. Although the centralized cluster scheme, LEACHC, uses base stations for cluster formation, it requires each sensor know its location (e.g., via a GPS device) and transmit its location to the base station. The routing scheme in LEACH requires intelligent sensors with power control capability. Furthermore, the cluster heads communicate directly to the base stations, which is more energy consuming than multi-hop routing. What is needed is a method for forming clusters with minimum processing and communication requirements and costs on sensor nodes, with simple forwarding of data packets through multi-hop relays to a data collection point such as a base station.

In GRAB, a data sink sets up a cost field in the network by broadcasting an advertisement packet to the entire network. Each node, upon receiving the advertisement packet, calculates the minimum cost from itself to the data sink. Then, data packets can be forwarded from higher cost nodes to lower cost nodes, through a mesh with a controllable width lying between the source and the data sink. While GRAB provides an error-resilient method by forwarding data packets through multiple paths, it would be helpful to lower the control overhead (e.g. broadcast advertisements) required by GRAB for wireless sensor networks.

The following characteristics are desirable for control and routing protocols designed for such networks:

Scalability: routing protocols should perform well as the network size grows.

Low complexity: control and routing algorithms should be simple, i.e., with minimum processing, communication, and storage requirements, since sensors generally have very limited capabilities in these areas.

Energy-efficiency: sensors are usually powered by batteries, while recharging is not feasible. In order to extend the lifetime of the sensors (and thus the sensor network's lifetime), the control and routing protocols should be simple and energy efficient.

Error-resilience: wireless sensors are usually deployed in harsh environments (e.g., in the wildness), and are thus exposed to possible damage from, e.g., extreme weather, temperature, pressure, or erosion. In addition, wireless links in a wireless sensor network are fragile and error-prone. Therefore, an error-resilient and robust routing protocol is desirable to ensure successful delivery of data packets.

In addition, the network topology changes when sensor nodes die or when new sensors are deployed. In this case, the network may need reconfiguration, requiring control and routing protocols that are adjustable in the context of such dynamic re-configurations.

SUMMARY OF THE INVENTION

It is therefore an object of the present invention to provide a method for network control and routing in a wireless sensor network that will perform well as the size of the network grows.

An object of the invention is also to provide network control and routing protocols for wireless sensor networks that are operable when the sensor nodes are very small and have extremely limited storage, processing, and communications capabilities and energy.

Another object of the invention is to provide a location information, synchronization, and data routing method that is simple, with minimum processing and storage requirements on the sensors in a wireless network.

It is also an object of the invention to provide optimal or flexible routing in sensor networks via edge-based mechanisms.

A further object of the invention is to achieve high energy efficiency in the data routing method, in order to extend the lifetime of sensors powered by batteries where recharging is not feasible.

It is also an object of the invention to enable network programmability of a wireless sensor network via edge-based mechanisms.

Another object of the invention is to provide a data routing method that is error-resilient, to accommodate wireless sensors deployed in harsh environments and where wireless links are fragile and error-prone.

Yet another object of the invention is to enable simpler tasking and query functions in wireless sensor networks via edge-based mechanisms.

An aspect of the invention is a method for operating a wireless sensor network via mechanisms at the edge of the network. An embodiment of this method is to use power controlled directional antennas to convey control information to sensor nodes. For example, directional antennas can be used to partition the network into regions. Each of the sensor nodes in the network determines its location in one of the regions from control messages received from the base station driving the directional antenna. A sensor node sensing data forwards that information to the base station by a multi-hop process in a packet generated by the sensing node. The packet includes the region ID of the sensing node. Another aspect of the invention is that sensor nodes also forward to the base station packets containing status reports of the condition of the sensors themselves, and these reports are analyzed by the base station. Based on this analysis, the base station sends control messages to the sensor nodes providing optimized routing instructions for packet forwarding.

The present invention is a novel and low-cost control and routing method for wireless sensor networks. The invention is based on the following observations. First, it would be desirable for a sensor to spend most of the available energy on its two basic operations: sensing and data forwarding. In other words, the routing protocol should have minimum control overhead on the sensors for an extended network lifetime. Second, there is an asymmetry in the capability and available resources in sensor nodes and base stations. It would be desirable to shift the burden of network control and management to resource-abundant and more sophisticated base stations, while keeping sensor nodes as simple as possible. Consequently, we take a totally different design approach from previous work, by shifting control and management functionalities to base stations and relieving sensor nodes with such burden. In accordance with the invention, a base station plays a major role in network control and routing. For example, a base station can convey location (and timing) information to sensor nodes by scanning the network with a power controlled directional antenna. The distance of a sensor to the base station can be uniquely determined by the power level used for a received control message, while the relative angle of the sensor to the base station is determined by the direction of the base station transmission. We show that such location information suffices for efficient routing of sensor data. More specifically, the proposed protocol consists of the following two key components:

Base station-assisted location discovery: each sensor needs to find out its location. Rather than resorting to Global Positioning System (GPS) devices or calculating location information among network sensors as in many existing location-based protocols, location discovery is performed in a centralized manner, where base stations perform a power-controlled scan of the sensor network using a directional antenna, and sensors infer their locations from received control messages sent by the base station. Therefore, the burden of location discovery is shifted from resource/capability constrained sensors to resource-abundant, more sophisticated base stations.

Location-aware data forwarding: the location information suffices for efficient routing of data packets. After receiving a data packet, each sensor simply examines the value of several header fields, then either drops or rebroadcasts the packet. The forwarding decision is based on location information determined by the sensor from the control message received from the base station. Therefore, there is no need for maintaining a location table or a routing table in every sensor node. A small number of duplicated data packets are forwarded towards the base station. The redundancy in packet forwarding ensures reliable delivery of data packets. This is particularly important in harsh environments or where there is a high failure rate of sensor nodes.

The invention allows extremely simple sensor designs, as would be useful in the cubic millimeter scale or even smaller, since most of the control functionalities are implemented on base stations. There is no need to exchange location, control, and routing messages among sensors. During the configuration phase, a sensor only needs to receive one or more control messages from the base station. Therefore, almost all energy is spent on the two key essential functions: sensing and forwarding sensed data. Very simple or other optimal routing schemes can be easily designed based on such location information. In addition, the routing scheme is also error-resilient, since each data packet may be forwarded along multiple paths, yielding a better chance of successful delivery.

Another aspect of this error-resilient routing scheme is that it provides for detection and mitigation of connectivity holes in the regions created by the directional scanning method. One of the mitigation techniques is routing around the connectivity hole, a technique that is also usable for bypassing regions on the network known to be unreliable due to a harsh or hostile environment and for achieving load balancing among different cells, maximizing network lifetime, and optimizing other routing-related objectives.

Under this invention, updated sensor program code can be distributed by the base station to sensor nodes in order to upgrade software on sensor nodes or reprogram sensor nodes and network behavior. Similarly, the base station can target reporting requests to particular regions. This aspect of the invention can also be used to provide to sensors more efficient code developed later in the life cycle of the network, or to provide code that enables sensors to perform new tasks, or to change the distribution of tasks in the collaboration between the network's core and edge. In summary, these control and routing functionalities of the invention are enabled through use of the capabilities of a powerful system such as a base station at the network's edge.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Consider a large-scale, dense sensor network consisting of thousands or even millions of sensors over a wide region sensing, e.g., chemical and biological agents. Assume that each sensor node is equipped with an inexpensive omni-directional antenna with a short transmission range. Should there be an event (e.g. release of a chemical or biological agent into the sensed field), the sensor data must be quickly-relayed to the base station along the sensor network cloud.

For such large scale sensor networks, fully-distributed network control and routing algorithms, although technically correct, may result in substantial algorithm complexity to perform control functions (e.g., localization, synchronization, and message exchanges to build up and maintain routing tables), or high requirements on the sensor node design (e.g., CPU, memory, energy, or communication), which may not be suitable to sensor nodes on the order of cubic millimeter or even smaller. Although hierarchical or cluster-based routing schemes are efficient in achieving scalability, the non-trivial overhead in maintaining the hierarchy in traditional clustering schemes should be minimized.

Figure 1:
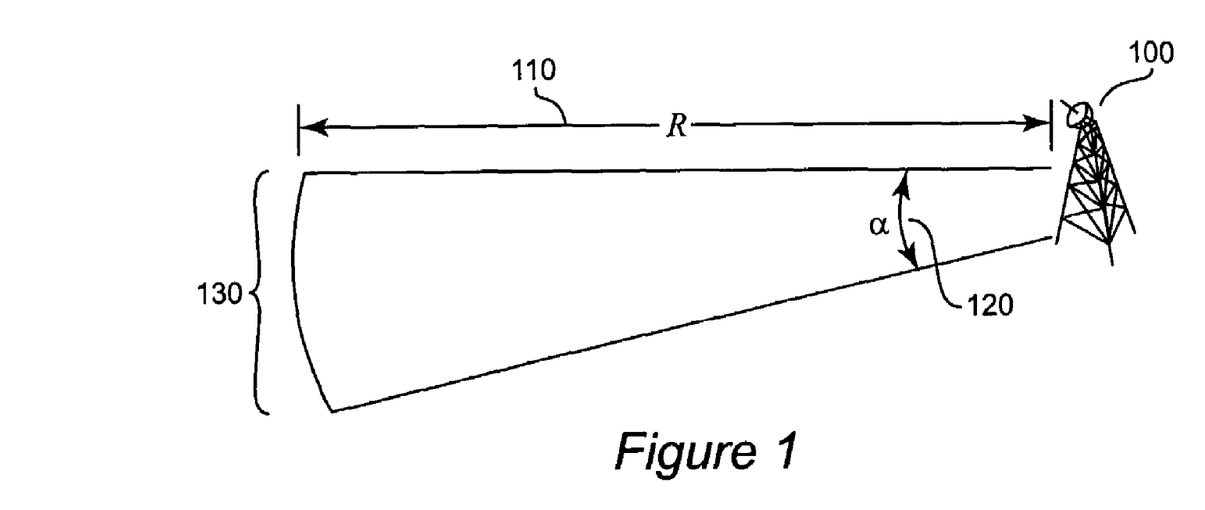
FIG. 1 is a diagram showing a sector made by a power controlled transmission from a directional antenna.

The approach of the present invention is to use infrastructure support provided by the base station to perform network control, including synchronization, intelligent location discovery, routing, network programming, code distribution, tasking, and query. This is a major departure from existing approaches, which may have considerable storage, processing, and communication requirements on each sensor node. In particular, the invention provides a base station that is not energy constrained and is equipped with a directional antenna with power control capability. With this scheme, the covered area of each base station transmission is a sector, as illustrated in FIG. 1. The radius of the sector, R 110, is determined by the transmission power, while the span of the sector 130, is determined by the beamwidth α 120 of the directional antenna 100 at the base station (not shown).

To determine the relative position of a node (or group of nodes) to the base station, the base station's directional antenna 100 scans the entire sensed region using different power levels. In other words, the base station sends control messages containing the current directionality information (indicating the relative direction toward the base station) and the transmission power level (indicating the relative distance toward the base station) to each direction multiple times, each with a different power level. A sensor node can then determine its location by the directionality of the last base station transmission received (called Sector Number (SN)), as well as the lowest power level information that it can receive from the base station (called Ring Number (RN)). We therefore define the ID of a sensor to be the combination of its RN and SN, i.e., {SN,RN}.

Figure 2:
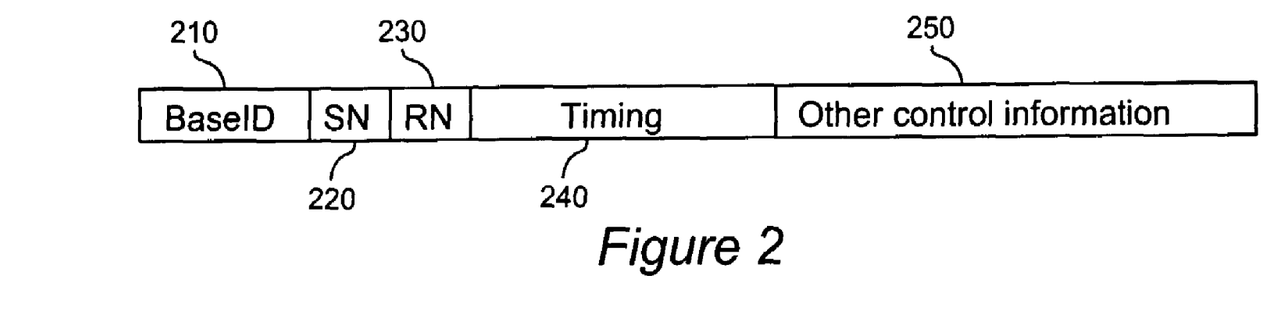
FIG. 2 is the packet format of a control message from the base station.
Figure 3A:
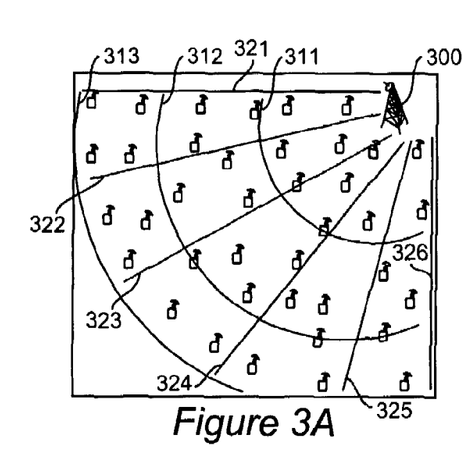
FIG. 3 is an illustration of the base station-assisted location discovery and synchronization process, with a series of directional transmissions into logically partitioned regions.
Figure 3B:
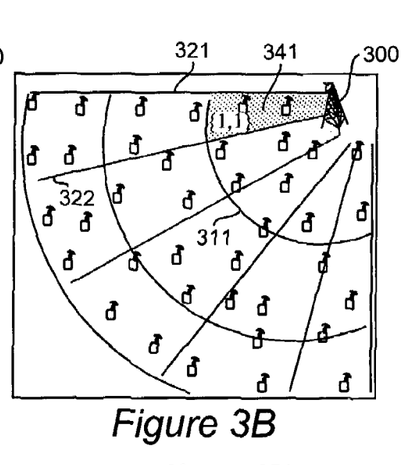
Figure 3C:
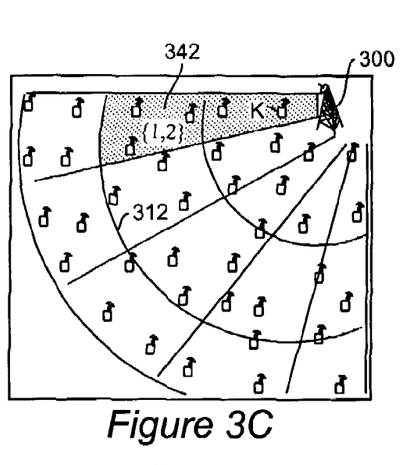
Figure 3D:
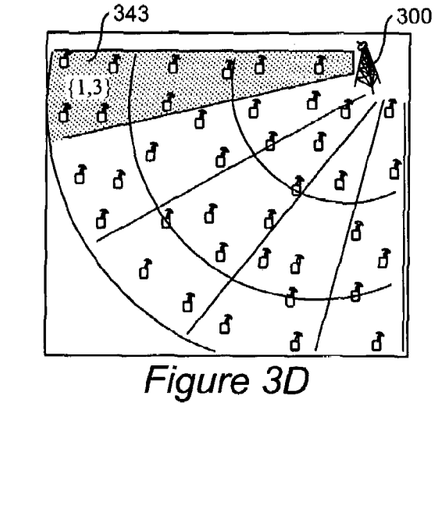
Figure 3E:
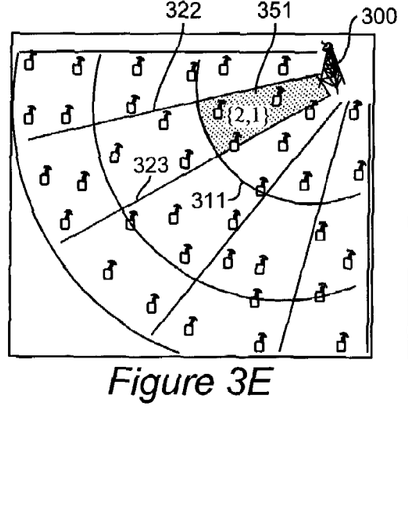
Figure 3F:
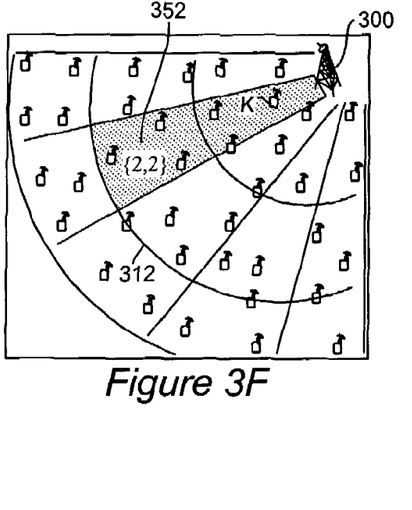

Control messages broadcasted by the base station can have a format as that shown in FIG. 2. The BaseID field 210 carries the identifier of the base station, which will be useful when multiple base stations are used. The SN field 220 carries the index associated with the direction of the current transmission, while RN 230 is the index associated with the current transmission power. The following field Timing 240 provides timing information used to synchronize clocks in each sensor node within a region. Additional control information 250 can also be carried in the packet.

A base station assisted location discovery process is illustrated in FIG. 3. As shown in panel (a) of FIG. 3, we have one base station with directional antenna 300 serving as the sink node for the entire network. By employing power control and tuning the phase angle of the directional antenna 300 at the base station, we can imagine that the network is logically partitioned into regions by the arcs 311, 312 and 313 and the radii 321, 322, 323, 324, 325 and 326. To identify the location of a region in the network, as shown in panels (b) through (f) in FIG. 3, the base station adjusts the phase angle, beamwidth, and transmission power of its directional antenna 300. The base station transmits to the first region 341 (shaded area) by adjusting its phase angle and beamwidth into the regions between radii 321 and 322, and adjusting the transmission power so that the signal will be detected by those sensors as far out as arc 311. During this transmission, the directional antenna 300 broadcasts a message with {SN,RN}={1, 1}, to all nodes within this region 341.

Subsequently, in panel (c) of FIG. 3, the base station adjusts the power level of its directional antenna 300 to the next higher level so as to reach those sensors in region 342 as far out as arc 312 and broadcasts a message with location information {SN,RN}={1, 2}. It will be observed that this higher power transmission will reach those sensors in region 341 as well as those sensors in region 342. When a sensor k receives multiple control messages, it chooses its Sector Number ($SN_k$) and Ring Number ($RN_k$) according to:

$$\begin{cases} SN_k = \max_{i \in \{rcvd\ ctrl\ msgs\}} \{SN_i\} \\ RN_k = \min_{i \in \{rcvd\ ctrl\ msgs\}} \{RN_i\} \end{cases} \quad (1)$$

Those sensor nodes that have acquired ID {1, 1} from the earlier scan will not change their ID, since through simple comparison, they can determine that a smaller ring number received earlier represents its geographical location (see Eq. (1)). All other nodes covered by the transmission but without location information from the lower power transmission will store this ID, i.e., {SN,RN}={1, 2}, to represent their geographical locations.

Panel (d) of FIG. 3 shows the case for a subsequent antenna transmission with a still higher power level, providing location information {SN,RN}={1, 3} to those sensors as far out as arc 313 including region 343. Again, nodes with a smaller ring number obtained during earlier transmissions will not change their IDs, in accordance with Equation (1). Only those nodes without any location information from the lower power transmissions will record this ID {1, 3}.

Panels (e) and (f) of FIG. 3 show a similar process for the case with SN=2 and RN changing from 1 to 2. The base station adjusts the phase angle of the directional antenna 300 so that the transmission's beamwidth is between radii 322 and 323 corresponding to SN=2. The power level is set to provide location information {SN,RN}={2, 1} to those sensors as far out as arc 311 including region 351, as shown in panel (e). Then the base station adjusts the power level of its directional antenna 300 to the next higher level so as to reach those sensors in region 352 as far out as arc 312 and broadcasts a message with location information {SN, RN}={2, 2}. As noted earlier, this higher power transmission will reach those sensors in region 351 as well as those sensors in region 352. When a sensor k in region 351 receives additional control messages from higher power transmission in the same direction (SN=2), it chooses its Sector Number ($SN_k$) and Ring Number ($RN_k$) according to Equation (1). While SN is the same in both messages, RN is different and sensor k will chose the minimum value (RN=1).

At the boundaries between sectors there may also be nodes receiving multiple messages, where the value of SN is different. For example, consider a sensor at the sector boundary between sector {1,1} (item 341 in panel (b)) and sector {2,1} (item 351 in panel (e)). Using Equation (1), the sensor receiving both messages will choose the maximum value SN=2. Those skilled in the art will observe that this choice between adjacent sectors could also have been made by choosing a minimum value for $SN_k$, with a corresponding change in Equation (1).

By repeating power control (RN) and phase change (SN), all sensor nodes can derive their IDs (i.e., location information). Note that during this process, there is no need for each sensor node to exchange any information with its neighbors. The complexity on the control plane has been effectively shifted from each sensor node to the base station.

A Simple Location-Aware Data Forwarding Method

Figure 4:
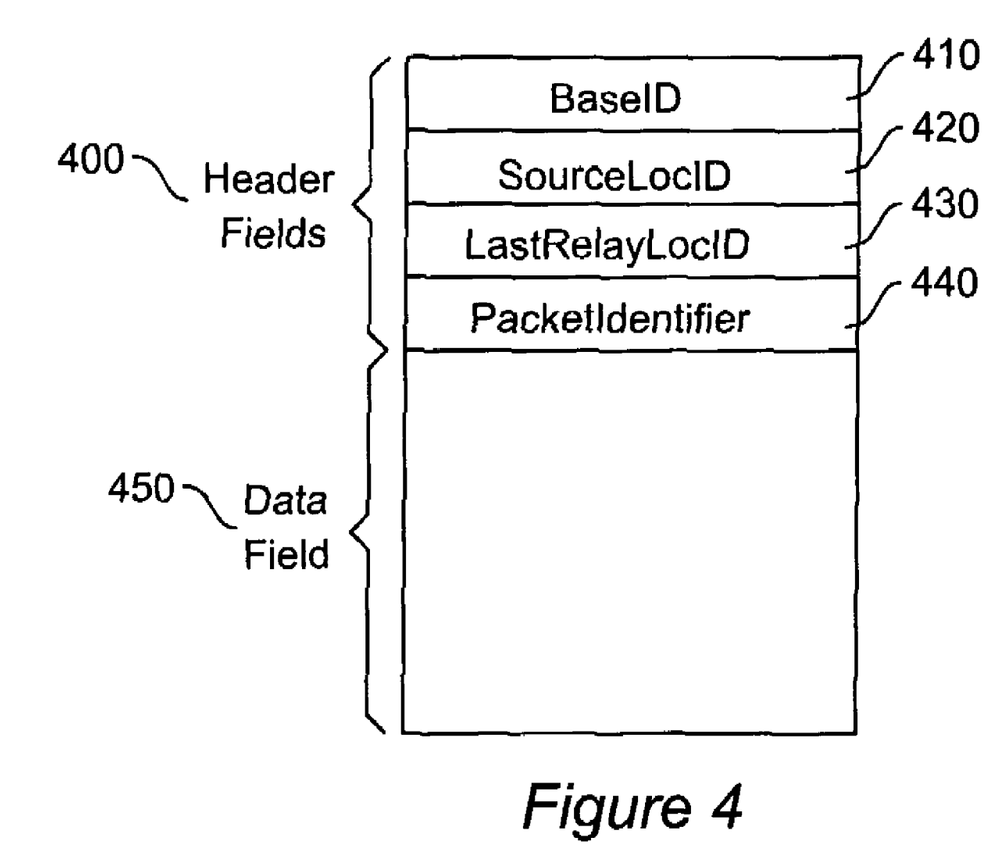
FIG. 4 is the packet format of a sensor data packet.

After the initialization phase, we now show that routing of sensor data packets can be implemented with minimum complexity. Since generally low-cost, short-range radio is used in the sensor nodes, it is necessary to use multi-hop routing for data packets. The format of a sensor data packet is shown in FIG. 4. The header fields 400 are:

BaseID 410: the identifier of the destination base station. This field is useful when multiple base stations are deployed, with possible overlapped coverage for certain regions in the network.

SourceLocID 420: the location identifier, i.e., {RN, SN}, of the source sensor node.

LastRelayLocID 430: the location identifier of the last sensor node that forwarded this data packet.

PacketIdentifier 440: a unique packet identifier. The best mode of implementation is to use a PacketTimeStamp, which is the time instance when the packet is generated. It is set by the source sensor node when the packet is generated, based upon network timing (Timing) set by the base station.

In order to avoid forwarding the same packet multiple times, each sensor examines the PacketTimeStamp of a received packet. Each sensor maintains a short queue for TimeStamps of recently received packets for each source region. When a new packet is received, its PacketTimeStamp is compared with the stored TimeStamps. If the new packet's TimeStamp is larger than those in the queue with the same SourceLocID, the new packet will be rebroadcast and the new PacketTimeStamp will be inserted into the queue (and the oldest TimeStamp with the same SourceLocID will be dropped if the queue is full). On the other hand, if there is a match or the new packet's TimeStamp is smaller than those in the queue with the same SourceLocID, the packet has been rebroadcast before and hence will be dropped. Note that the use of the TimeStamp queue can effectively handle duplicate packets. Only a small queue is needed for TimeStamps, placing a very low storage and comparison overhead on the sensors.

Figure 5:
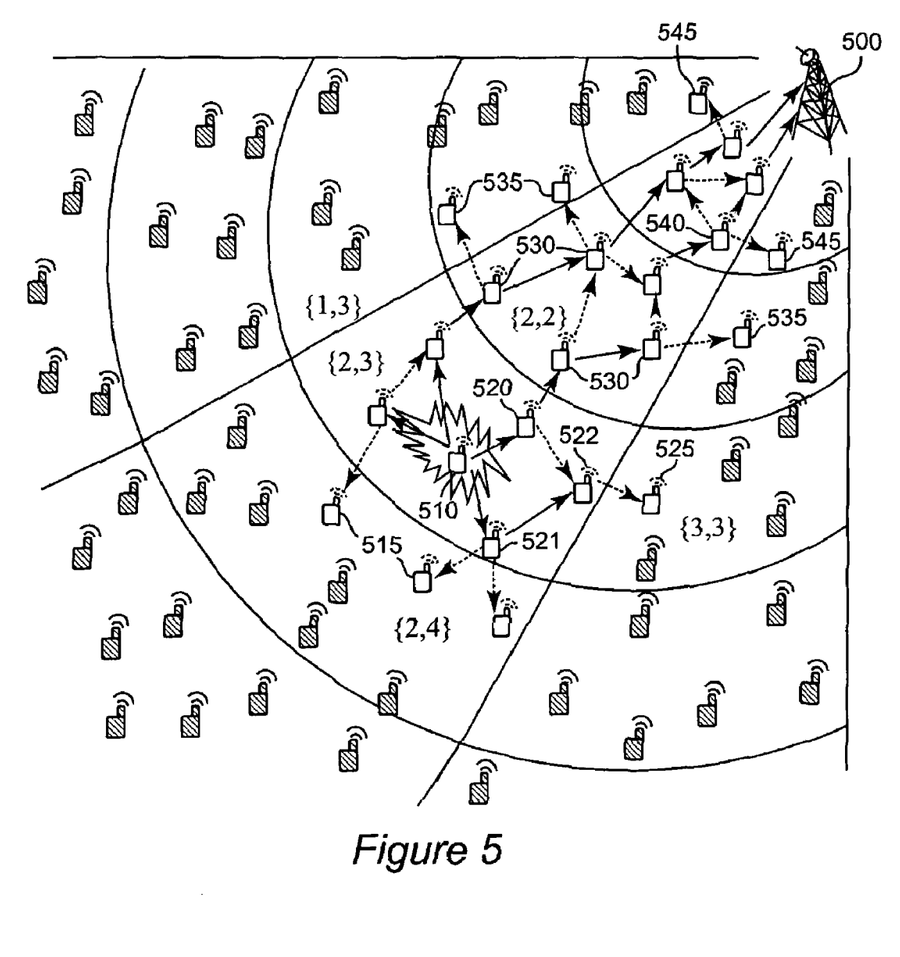
FIG. 5 is an illustration of location-aware data forwarding in accordance with the invention.

This packet forwarding method may be shown with reference to FIG. 5, in which an event in region {2,3} is sensed by sensor node 510, which then creates a data packet and applies a PacketTimeStamp as the unique PacketIdentifier 440 to the packet. Originating sensor node 510 then broadcasts the packet, which is received by sensor nodes 520 and 521. The solid line arrow (emanating from sensor node 510) indicates that this is the first packet with this PacketTimeStamp received by nodes 520 and 521, which therefore rebroadcast the packet and store the packet's TimeStamp in their respective TimeStamp queues. Sensor node 522 receives the packet with this PacketTimeStamp first from sensor node 521, as indicated by the solid line arrow between sensor node 521 and sensor node 522. Sensor node 522 then inserts the new PacketTimeStamp into its TimeStamp queue and rebroadcasts the packet. When the second rebroadcast of this packet reaches sensor node 522 from sensor node 520, the packet's TimeStamp is already in the TimeStamp queue of sensor node 522, as indicated by the dashed line arrow between sensor node 520 and sensor node 522. Therefore, the duplicate packet received from sensor node 520 will be discarded.

At the four boundaries of this region, only sensor nodes in the region with ID {2, 2} will further relay this packet; packets received by the nodes in other three neighboring regions, i.e., regions with IDs {2, 4} as shown by sensor nodes 515, {1, 3}, and {3, 3} as shown by sensor node 525, will be dropped. This is due to the fact that relaying in these regions will not bring the packet closer to the base station. The forwarding decision is made with a simple comparison of the IDs of the current node and the last relay node (i.e., LastRelayLocID in the received packet). Only sensor nodes in region {2, 2} as shown by sensor nodes 530 have an identical SN and a smaller RN, and will thus relay this packet toward the base station. By following this process of broadcast, reception, and drop or rebroadcast among the sensor nodes, the packet (or duplicate copies of the same packet) will be eventually delivered to the base station.

There are many advantages of using this routing scheme. First, the intermediate sensor nodes do not need to store a routing table or maintain routing related control information. There is even no need for the sensors to discover their one-hop neighbor nodes. Each node operates in a purely stateless manner, using only local location information (i.e., its ID and TimeStamp, which come from packets received directly from edge base station). The processing and communication requirement on the sensor node design are minimal, which is suitable for sensor nodes at cubic-millimeter scale. Second, the storage requirement is also minimal. Each sensor node only needs to store its ID, TimeStamp, and a small queue for the most recently received packet headers, which suffice for efficient routing. Moreover, the size of the packet header queue can be quite small, as discussed. Third, the routes to the base station are loop-free due to the use of TimeStamps and sensor IDs. Fourth, since every data packet is essentially forwarded by multiple nodes through different routes, multiple copies of the same data packet will be delivered to the base station. Such redundancy is necessary in wireless sensor networks where links are fragile and sensor nodes are vulnerable.

The above description illustrates a simple data forwarding method based on location information at sensor nodes. More powerful routing methods that can achieve pre-defined optimization objectives will be described below in the "Computing and Distributing Optimal Routing Path" section later in this application.

Query for Events

In many applications, it is necessary to allow the base station to query the sensor network for certain events, with the expectation that a report will return in a timely fashion. Existing approaches consider the sensor network as a distributed database that relies on sensor nodes to perform all of the tasks in the query process. As expected, algorithms designed using this approach are likely to be complex and costly when implemented on a sensor node. It is also very difficult for existing core-based approaches to accomplish a distributed query process without the involvement of peer communications among a large number of sensor nodes, most of which may be irrelevant to this process from a data-centric perspective.

The present invention overcomes these limitations. To query a specific region, the base station can adjust its direction according to the target $SN_t$, set its transmission power level according to the target $RN_t$, and then transmit a query message with the target ID $\{SN_t, RN_t\}$. By a simple comparison of the IDs, sensors in other regions will ignore this query, while sensors in the target region will generate responses and route them to the base station through multi-hop relays. In the case that the sensors are put to sleep for energy savings, the base station can wake up the sensors in the intermediate regions before sending the query message, thus the response latency can be greatly reduced.

Tasking

Tasking refers to assigning specific jobs to a sensor network to achieve a particular application (target tracking, data sampling, etc). Some earlier sensor networks were designed to accomplish only a specific task. Such networks are not flexible when the needs of the network change, since different applications would require different sets of algorithms and protocols. Now, designers have realized that it is highly desirable to design sensor networks that can be programmed with new tasks on demand, i.e., sensor networks capable of offering different applications when instrumented with different user needs. Unfortunately, tasking is an extremely difficult problem, since it touches upon some of the most difficult problems in distributed systems and database management, in addition to the existing constraints on a sensor node. For example, it is difficult to implement any distributed tasking algorithm in an efficient manner without invoking peer communications among a large number of sensor nodes.

Figure 6:
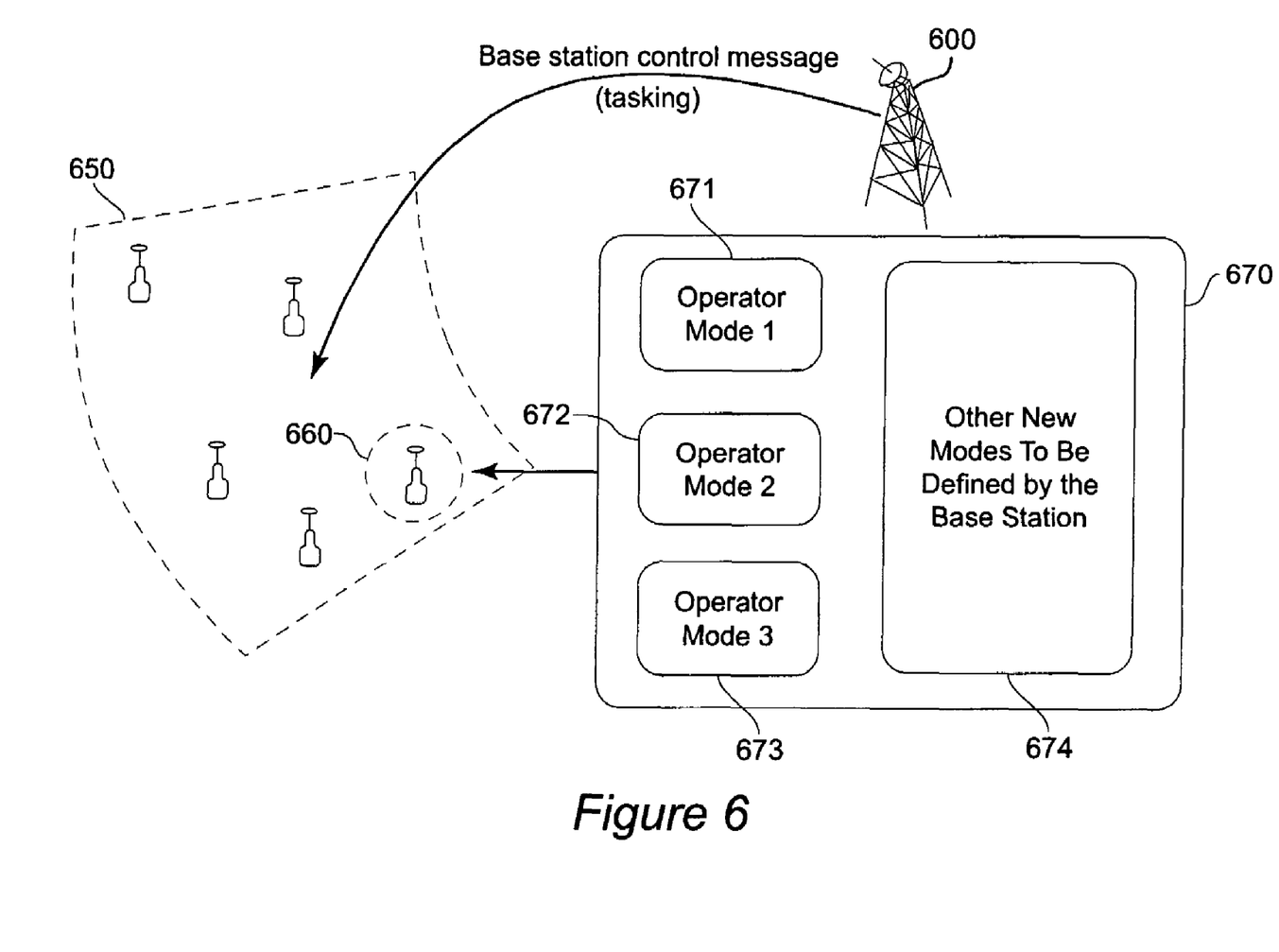
FIG. 6 is an illustration of a base station control message dynamically configuring the operation mode of sensors in a region.

The invention provides an effective solution to the tasking problem, as may be shown with reference to FIG. 6. The base station 600 sends a control message to a region 650, and the message will be received and acted upon by sensor node 660 in the region 650. Suppose that each sensor node 660 in the region is programmed upon deployment to operate in three operation modes 671, 672 and 673. The control message could then indicate which operation mode is to be used by sensor nodes 660 in the region 650. Successive control messages from the base station 600 could change the operation mode from one mode to another, effecting dynamic configuration of the sensor nodes in the region. More generally, the operational modes 670 at sensor nodes 660 do not need to be pre-stored before deployment, as shown by operation modes 671, 672 and 673 in FIG. 6. The edge base station can convey new operational modes 674 through the tasking process even after sensor nodes have been deployed.

Reallocation and Reorganization

Figure 7A:
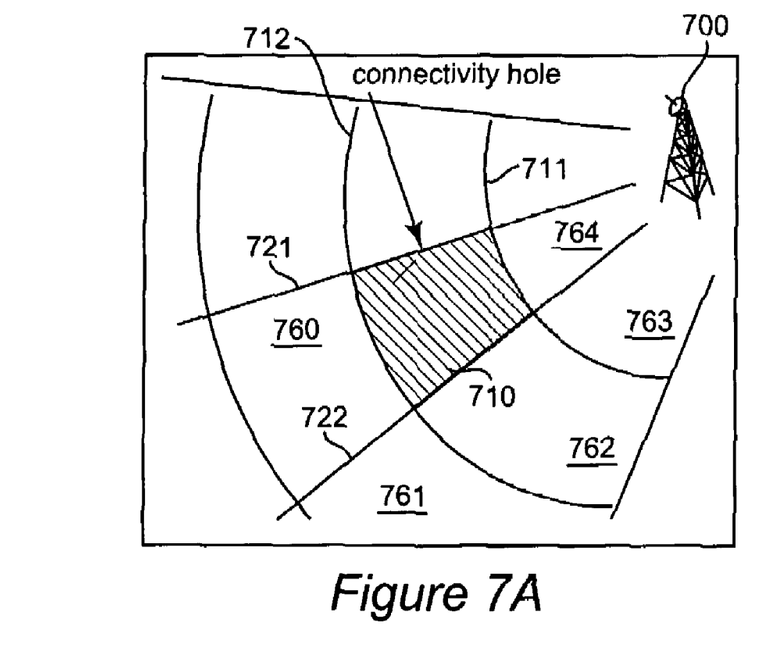
FIG. 7 is an illustration showing a rescan of the sensor network to bypass a connectivity hole in the sensed field.
Figure 7B:
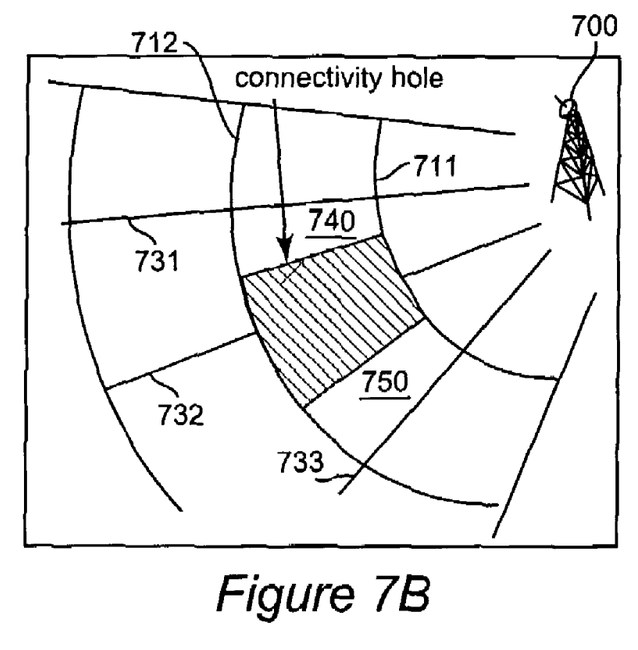

When the sensor network is reorganized (e.g., old sensors are damaged or run out of energy) or reallocated (e.g., new sensors are deployed), or when the base station moves to a new location, the regions can be quickly reestablished by a new scanning process. Also, the base station can scan the network and refresh the location information in the sensor nodes periodically. In particular, the base station can periodically query the region with the highest ring number in each sector in order to test connectivity within the sectors. When a sector loses connectivity, as indicated by a timeout, the base station can simply rescan the network to form new regions to restore connectivity. For example, in the example shown in panel (a) of FIG. 7, there is a connectivity hole 710 in the sensor network (marked in black). That is, the region 710 bounded by arcs 711 and 712 and radii 721 and 722 contains no operable sensor nodes. After rescanning the sensor network with new directions, a set of new regions are formed, as shown in panel (b) of FIG. 7. The rescan creates new regions 740 and 750, bounded by arcs 711 and 712, as before, but also bound by new radii 731 and 732 (for region 740) and radii 732 and 733 (for region 750). Since both new regions 740 and 750 contain operable sensor nodes, the connectivity hole is circumvented.

Such reconfiguration has a very low cost, since there is no need for peer communication and computing among the sensors. Rather, each sensor node just needs to receive one or more configuration messages from the base station, and then the reconfiguration is accomplished.

A second approach is to have the base station change the routing behavior of sensor nodes in certain regions so that packets will not be blocked by the hole. For example, the base station could send out routing instructions to those sensor nodes in regions surrounding the hole to relay packets that are otherwise blocked by the hole. As shown in panel (a) of FIG. 7, packets to be forwarded toward the base station 700 by sensor nodes in region 760 are blocked because there are no receiving sensor nodes in cell 710 and the sensor nodes in region 761 are programmed to discard packets forwarded from sensor nodes in adjacent region 760. To resolve the problem caused by the connectivity hole 710, the base station sends new routing instructions so that packets forwarded by sensor nodes in region 760 would be rebroadcast by the sensor nodes in region 761 rather than discarded, and similarly forwarded toward the base station through regions 762, 763 and 764. Such explicit instructions from a base station overwrite the default routing configuration of these sensor nodes. Note that under this approach, an edge base station only needs to instruct a small number of cells to change their routing configuration in order to mitigate holes in the network; the configuration of the remaining cells is intact.

Under the core-based approach, although it is also possible to design algorithms that have sensor nodes route around holes for packet delivery, the complexity and burden to implement these algorithms on sensor nodes are hardly negligible. In contrast, the approach of the present invention shifts such complexity to the network edge and relieves sensor nodes of the burden of implementing sophisticated routing algorithms and protocols to handle such problems.

Computing and Distributing Optimal Routing Path

The idea of reconfiguring routing behavior of certain cells can be further exploited, particularly if certain objectives or constraints need to be met by routing. For example, this capability of the invention can be exploited to bypass certain spots in the network that are known to be unreliable due to a harsh or hostile environment. Also, loads can be balanced among different cells to maximize network lifetime and optimize many other routing-related objectives. Note that such routing capability would otherwise be extremely difficult to achieve if edge capabilities are not effectively used. In other words, the invention not only reduces complexity at sensor nodes in the network core, but also offers some unique advantages that are otherwise difficult to accomplish with the prior art core-based approach.

As an example, suppose that the base station has found that several spots in the network are either not functioning properly or compromised by adverse conditions. The base station could compute alternative "optimal" routes based on the logical network map derived from the cell structure and status information from feedback packets. To achieve this objective, an edge base station will use directional antennas to instruct certain cells in the network to modify their forwarding behavior, and to follow a routing approach similar to the one discussed above for bypassing connectivity holes.

The base station could calculate an optimal routing path in the network based on remaining energy status in different portions of the network. A key problem in making such optimal routing possible is to obtain a network status report (or feedback) at the network edge in a timely fashion. It is extremely important to minimize control traffic associated with such activity, as such activity itself could be communication intensive. Note that if the routing granularity is on the cell level, it is reasonable to expect that the energy consumption status for sensor nodes within the same cell will be very similar. As a result, it is only necessary to have a summary report about energy status for the entire cell instead of for each individual sensor node. An effective approach to this problem is to piggyback status information in data packets.

Figure 8A:
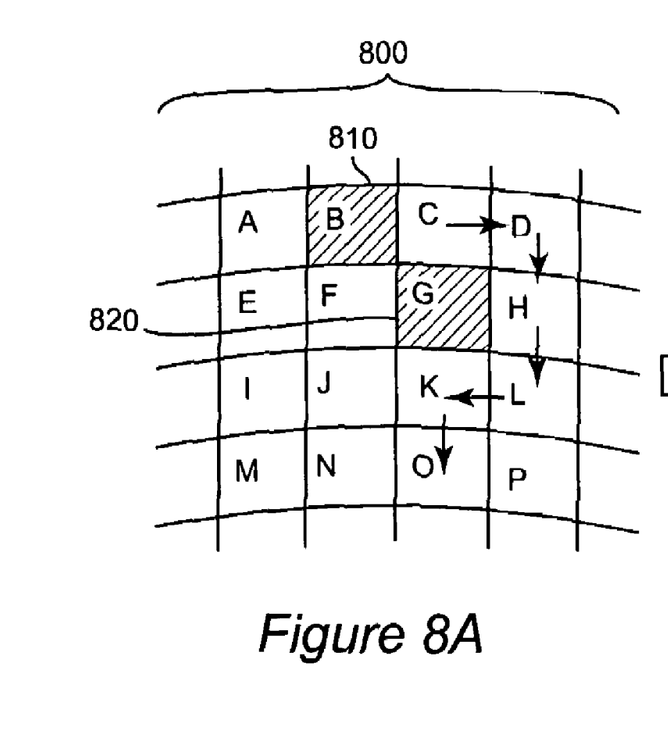
FIG. 8 is an illustration of optimal routing for the sensor network as controlled by a base station.
Figure 8B:
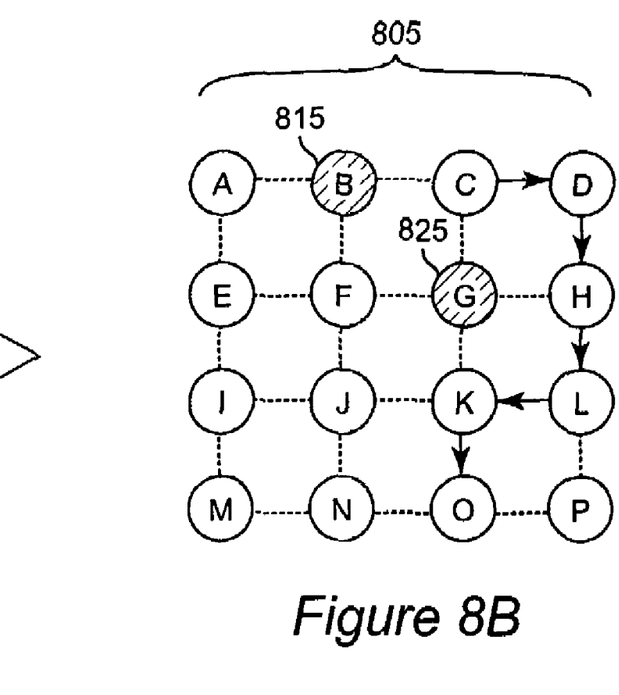

FIG. 8 may be used to illustrate base station computation of optimized routing in a situation where both load balancing and bypassing are necessary. In panel (a) of FIG. 8, there is shown a sensor network 800 where region B 810 has low remaining energy and region G 820 is compromised or damaged. The base station maintains a logical chart or graph 805 of the network 800, and has determined from received information the condition and status of regions B 810 and G 820, which are represented in the base station's network graph 805 by B 815 and G 825, respectively. The base station then computes an optimal route around these regions, comprising a path through regions C, D, H, L, K, and O. The base station will then send appropriate control messages to the sensor nodes in regions C, D, H, L, K, and O of the network 800 in order to effect the optimal route, as shown by the arrows connecting regions C, D, H, L, K, and O in panel (a) of FIG. 8.

Code Distribution and Programmability

Code distribution refers to the delivery of software code to sensor nodes in the network. These codes could include patches, new versions of firmware, OS's, protocol software, and so forth. An alternative approach to code distribution is to deploy new sensor nodes in the network, which is not only wasteful and creates more hazards to the environment, but also problematic, since a partial re-deployment may run into compatibility problems. Furthermore, future sensor nodes may have the capability to "harvest" energy from the natural environment. It is likely that such nodes will live many years. Consequently, it is highly desirable to be able to update the codes in these sensor nodes even after deployment.

Efficient code distribution has been one of the most difficult problems in wireless sensor networking, predominantly because existing approaches rely solely on sensor nodes to accomplish this task. As expected, such a core-based approach places a substantial processing and communication burden on sensor nodes. The present invention provides a new method, by enabling exploitation of capabilities at the network edge to accomplish code distribution. This method is embodied by having the base station convey codes directly to a specific region in the network. Under this method, each sensor node will merely act as a passive receiver during the code distribution process. All of the complexity and burden on sensor nodes associated with core-based approaches can thus be effectively eliminated. Sensor nodes can instead focus on their primary functions, such as sensing and collaborative information processing (data fusion), and delegate such control plane function to the network edge. As a result, constraints associated with storage, processing, communication, and energy at each sensor node can be greatly alleviated.

Additional Details

We will now discuss some additional details in implementing the method of the invention.

Creating Finer Regions

With the location discovery scheme described above, regions get larger as the ring number RN increases. Although larger regions make sensing data less precise, such imprecision is allowed by most of the sensor applications. Furthermore, this is justified by the so called distance effect: the farther an event is, the less important it is, and thus less precise sensing is allowed.

Figure 9:
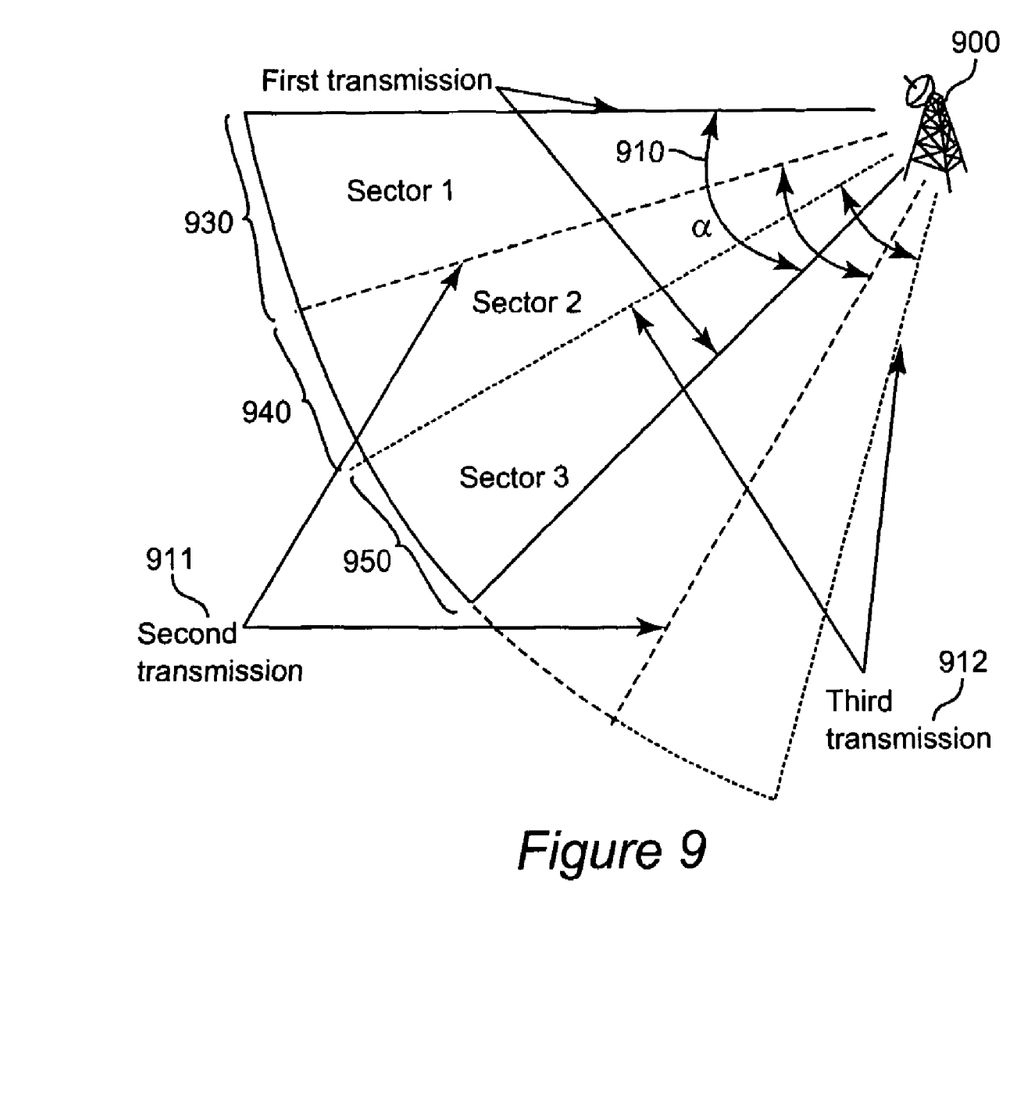
FIG. 9 is an illustration of the use of overlapping transmissions to create sectors narrower than the beamwidth of the directional antenna.

When higher sensing accuracy is necessary, the size of the regions can be reduced by choosing finer power levels and setting narrower beamwidths for the directional antenna of the base station. In addition, an overlapped scanning scheme as shown in FIG. 9 allows creating sectors narrower than the minimum beamwidth of the directional antenna 900, in case that the minimum antenna beamwidth is still too coarse. Let the antenna beamwidth be $\alpha$. In the example shown in FIG. 9, the base station makes three overlapped transmissions sequentially 910, 911 and 912, by shifting its directional angle by $\alpha/3$ each time. Each sensor node, after receiving multiple control messages, uses Equation (1) in selecting its SN. This will result in creation of three sectors, 930, 940 and 950, each with a span of $\alpha/3$.

Deploying Multiple Base Stations

Note that the invention requires the entire sensor network be within the maximum transmission range of the base station, such that the sensors can be configured by the base station as shown by the example in FIG. 3. For sensor networks that expand to cover vast areas, multiple base stations may be necessary to provide full coverage for the sensor nodes in the network. The invention can be easily extended to support multiple base stations in even larger sensor networks. Further, the coverage areas of different base stations may overlap, as will be discussed below. The basic operation of the sensor nodes are the same as discussed above, with only a slightly increased storage requirement.

Figure 10A:
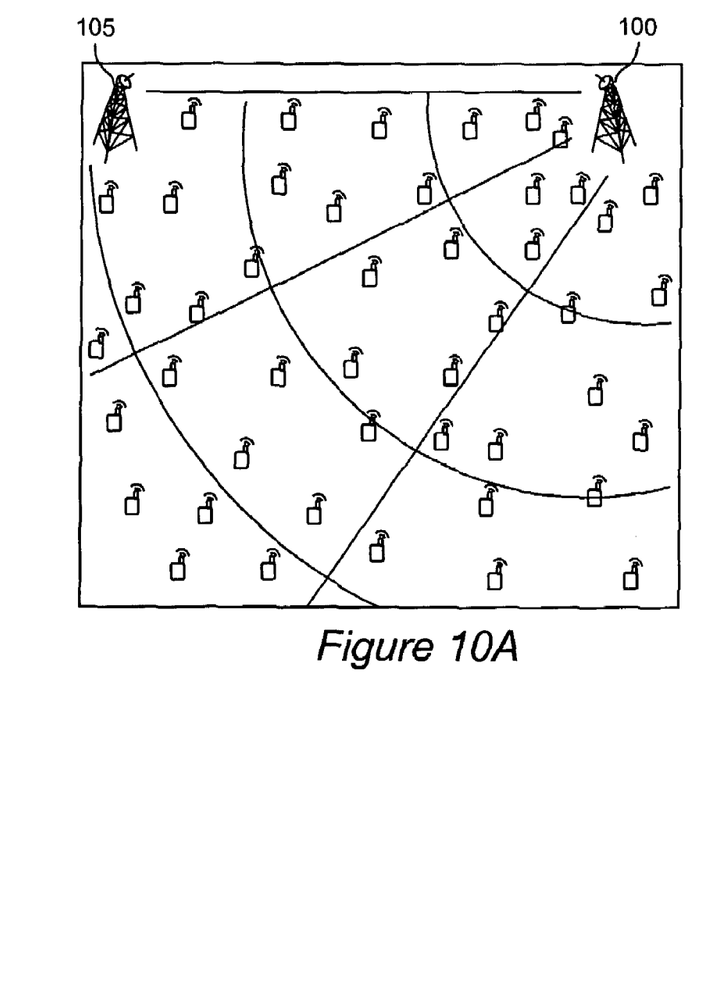
FIG. 10 is an illustration of the use of two base stations to take turns scanning a sensed field.
Figure 10B:
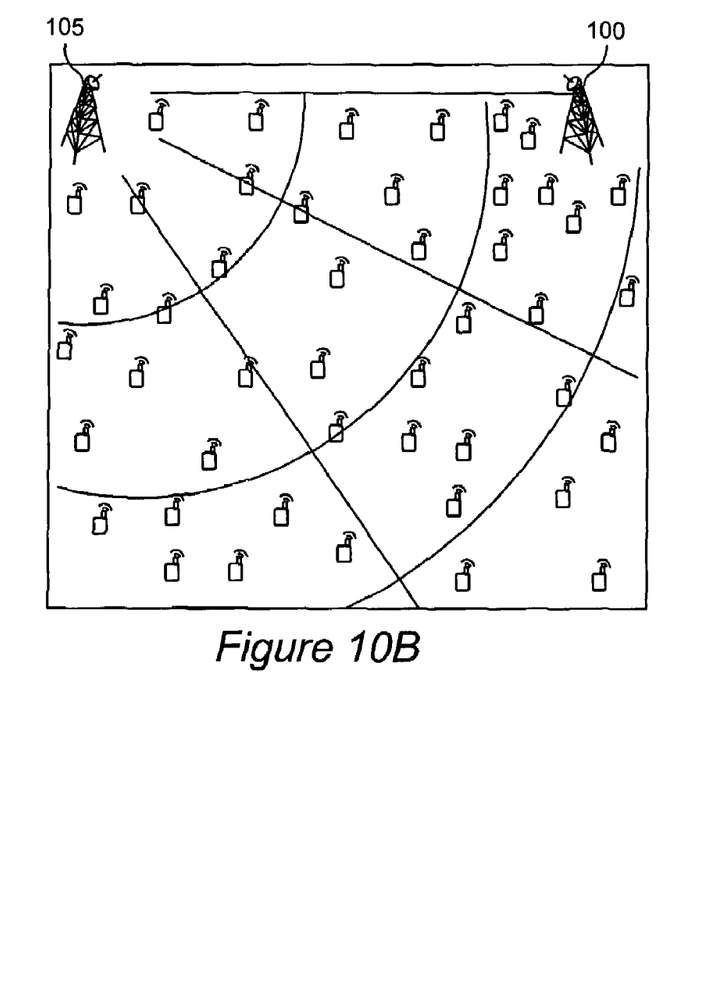

An example of a sensor network with two base stations is presented in FIG. 10. In this application scenario, the base stations use their respective directional antennas 100 and 105 to perform their scans in turn. The regions partitioned from the scan of directional antenna 100 is shown in panel (a) of FIG. 10. The regions partitioned from the scan of directional antenna 105 is shown in panel (b) of FIG. 10. The respective regions overlap. A sensor node may receive two IDs, each associated with one of the base stations. When a sensor detects an important event, it can simply choose the closer base station (by comparing the RNs of its two IDs) to forward the packet to. An intermediate sensor node, after receiving a data packet, will first check the BaseID of the packet (set by the source node). Then, the node makes comparison and drop/forward decision using the ID and TimeStamp queue associated with the chosen base station.

A refined scheme can also be applied in the multiple base station case, in order to balance the traffic load and energy consumption of the sensors. Suppose there are N base stations. With this scheme, the source sensor randomly chooses a base station i as destination with probability $p_i$ defined as:

$$p_i = \frac{\frac{1}{RN_i}}{\sum_{k=1}^{N} \frac{1}{RN_k}} \quad (2)$$

With Equation (2), traffic generated by the source node is distributed among all the base stations in a fashion such that a closer base station is chosen with a higher probability.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. A method for operating a wireless sensor network, comprising the steps of:
   using a power controlled directional antenna by a base station to partition the network into a plurality of regions, each of a plurality of sensor nodes in the network determining its location in one of said regions from control messages received from said base station; and
   forwarding to said base station data sensed by one of said sensor nodes, said data being contained in a packet generated by said data sensing node and including said location determined by said data sensing node, said packet being forwarded by a multi-hop process.

2. A method for operating a wireless sensor network as in claim 1, further comprising the steps of:
   forwarding to said base station packets containing status reports of a condition of said sensor nodes in respective regions;
   analyzing by said base station of said status reports; and
   sending control messages from said base station to sensor nodes providing optimized routing instructions for packet forwarding by said sensor nodes, said optimization being responsive to said analysis of said status reports.

3. A method for operating a wireless sensor network as in claim 2, wherein said analyzing step determines energy consumption levels of sensor nodes by region and said routing instructions balance said energy consumption levels among regions.

4. A method for operating a wireless sensor network as in claim 3, wherein said analyzing step additionally identifies regions unreliable for forwarding and said routing instructions additionally bypass said unreliable regions.

5. A method for operating a wireless sensor network as in claim 2, wherein said analyzing step identifies regions unreliable for forwarding and said routing instructions bypass said unreliable regions.

6. A method for operating a wireless sensor network as in claim 1, wherein said packet is rebroadcast no more than once by any sensor node in said network.

7. A method for operating a wireless sensor network as in claim 6, wherein a sensor node rebroadcasting a received packet stores in a packet header queue a packet header extracted from said packet, said packet header containing a source region and a packet identifier, said packet being rebroadcast if said packet header is not already in said packet header queue.

8. A method for operating a wireless sensor network as in claim 7, wherein said sensor node is synchronized with a timing identifier received by said data sensing sensor node from said base station in a control message.

9. A method for operating a wireless sensor network as in claim 7, wherein said packet identifier is a timestamp applied to said packet by said data sensing sensor node, and said packet header is not in said packet header queue if the source region is not in any packet header in the queue or, if the source region is the same for a packet header, the timestamp is newer.

10. A method for operating a wireless sensor network as in claim 1, wherein said packet received by a sensor node from a broadcasting sensor node is only rebroadcast by said receiving sensor node if said receiving node is a) in a region of said broadcasting sensor node, b) in a region closer to said base station than said region of said broadcasting sensor node, or c) in a region that is configured by the base station to perform such broadcasting.

11. A method for operating a wireless sensor network as in claim 1, wherein said partitioning is accomplished by transmitting a sequence of control messages, each said transmission being in a direction from said base station corresponding to an ordinal sector number of adjacent beamwidths of said directional antenna and having a power level sufficient to reach sensor nodes at a distance from said base station corresponding to an ordinal ring number, each said sensor node having a location in a region relative to said base station defined by a sector number and a ring number, each said sensor node receiving more than one said control message determining said region of its location by selecting the lowest ring number and the highest sector number in said received messages.

12. A method for operating a wireless sensor network as in claim 11, further comprising the steps of
    detecting a region containing no sensor nodes, said region being a connectivity hole, and
    mitigating said connectivity hole.

13. A method for operating a wireless sensor network as in claim 12, wherein said detecting step further comprises the steps of
    sending a control message to said region, and
    waiting beyond a timeout period without receiving a response to said control message from a sensor node in said region.

14. A method for operating a wireless sensor network as in claim 12, wherein said mitigating step further comprises the step of repeating said partitioning step, wherein said sectors are shifted by a fraction of said beamwidth.

15. A method for operating a wireless sensor network as in claim 12, wherein said mitigating step further comprises the step of sending control messages to regions adjacent to said connectivity hole instructing sensor nodes in said regions how to rebroadcast around said connectivity hole.

16. A method for operating a wireless sensor network as in claim 1, wherein processing, storage and communication tasks required for control of the network are performed by said base station.

17. A method for operating a wireless sensor network as in claim 1, further comprising the step of sending control messages from said base station to said sensor nodes providing tasking instructions.

18. A method for operating a wireless sensor network as in claim 1, further comprising the step of sending control messages from said base station to said sensor nodes, said control messages containing code to reprogram the network.

19. A method for operating a wireless sensor network as in claim 1, further comprising the steps of:
    sending a query message from said base station to sensor nodes in a region; and
    receiving responses to said query message forwarded by said sensor nodes in said region.

20. A system for monitoring conditions in an area comprising:
    sensor nodes dispersed throughout the area;
    a base station for controlling said sensor nodes and receiving data packets generated by said sensor nodes, at least some of said data packets containing reports of conditions sensed by said sensor nodes,
    wherein said base station uses a power controlled directional antenna to partition said area into a plurality of regions, each of said sensor nodes determining its location in one of said regions from control messages received from said base station, and
    wherein each said data packet includes said location of a sensor node generating said data packet.

21. A system for monitoring conditions in an area as in claim 20,
    wherein said packets contain status reports of a condition of said sensor nodes in respective regions;
    wherein said packets are forwarded to said base station by a multi-hop process;
    wherein said base station analyzes said status reports; and
    wherein said base station sends control messages to said sensor nodes providing optimized routing instructions for packet forwarding by said sensor nodes, said optimization being responsive to said analysis of said status reports.

22. A system for monitoring conditions in an area as in claim 21, wherein said analysis determines energy consumption levels of sensor nodes by region and said routing instructions balance of said energy consumption levels among regions.

23. A system for monitoring conditions in an area as in claim 21, wherein said analysis identifies regions unreliable for forwarding and said routing instructions bypass said unreliable regions.

* * * * *